(No Model.)
J. RICHARD.
BOILER TUBE CUTTER.
No. 558,422. Patented Apr. 14, 1896.
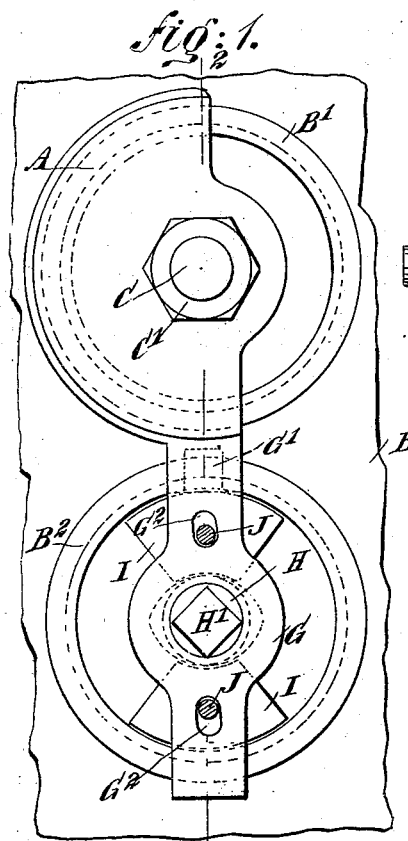
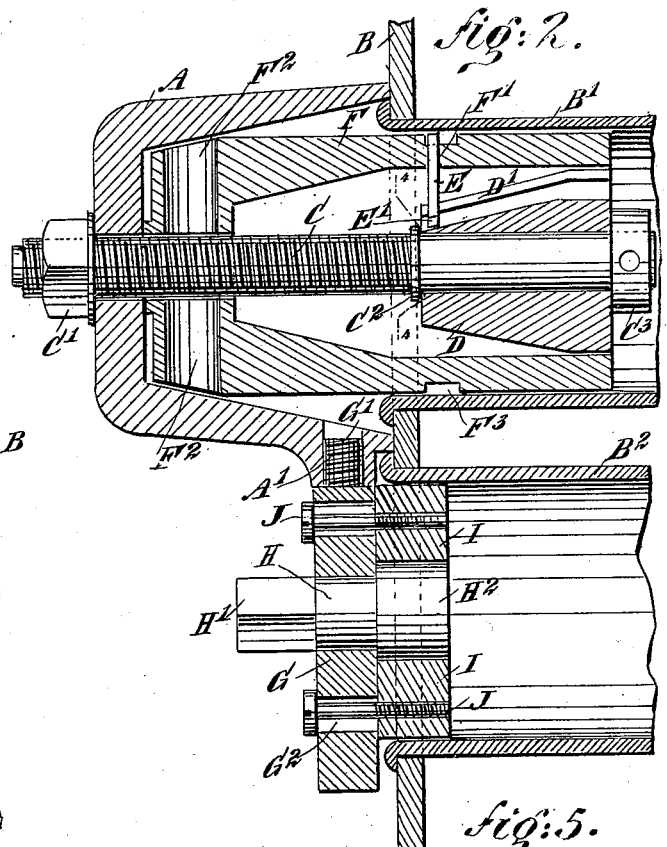
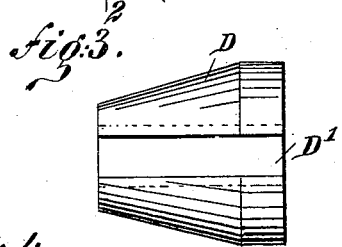
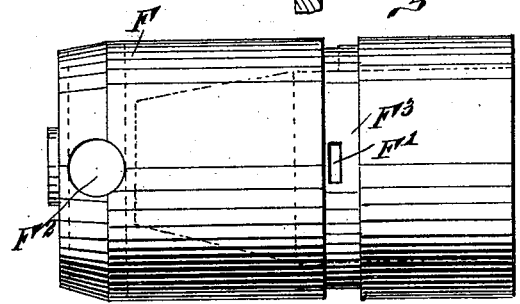
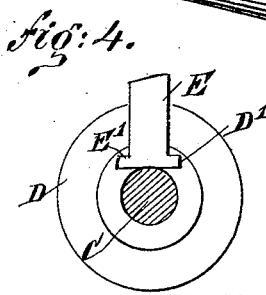
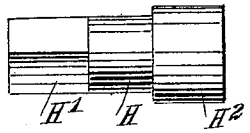
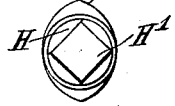
WITNESSES:
INVENTOR
J. Richard
BY
Munn & Co
ATTORNEYS.

UNITED STATES PATENT OFFICE.

JULIUS RICHARD, OF BISBEE, ARIZONA TERRITORY.

BOILER-TUBE CUTTER.

SPECIFICATION forming part of Letters Patent No. 558,422, dated April 14, 1896.

Application filed November 7, 1895. Serial No. 568,218. (No model.)

*To all whom it may concern:*

Be it known that I, JULIUS RICHARD, of Bisbee, in the county of Cochise and Territory of Arizona, have invented a new and Improved Boiler-Tube Cutter, of which the following is a full, clear, and exact description.

The object of the invention is to provide a new and improved boiler-tube cutter, which is simple and durable in construction, easily manipulated, and arranged to quickly and conveniently cut off a tube in the boiler, for removal and replacement of a new one.

The invention consists principally of a tool-carrier adapted to be turned, a cutter fitted to slide transversely therein, a feed-screw, and a feed-block held loosely on said feed-screw and moving longitudinally with the same, said feed-block being formed with an incline engaging said cutter, to feed the latter outwardly in contact with the tube to be cut.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1 is a front elevation of the improvement, with part in section. Fig. 2 is a sectional side elevation of the same, on the line 2 2 of Fig. 1. Fig. 3 is a plan view of the feed-block. Fig. 4 is a cross-section of the feed-screw, with the feed-block and cutter in position, the section being taken on the line 4 4 of Fig. 2. Fig. 5 is a plan view of the tool-carrier. Fig. 6 is a side elevation of the cam-shaft, and Fig. 7 is an end elevation of the same.

The improved boiler-tube cutter is provided with a stand or yoke A, adapted to rest on the front face of the sheet B of the boiler and surrounding part of the outer end of the flue B' to be cut. In the stand or yoke A is mounted to turn a feed-screw C, provided on its outer end with a nut C', resting on a washer placed against the outer face of the stand A, so that by turning the nut C' the feed-screw C is moved longitudinally inward or outward according to the direction in which the nut is turned.

The inner end of the feed-screw C is made smooth, and is provided with a fixed collar $C^2$ and a removable collar $C^3$, fastened in place by a set-screw, and between the two collars is arranged, loosely, a feed-block D on the smooth part of the feed-screw C, but moving longitudinally with the latter when the nut C' is turned.

The feed-block D is provided with a longitudinally-extending inclined dovetailed groove D', in which is fitted to slide the correspondingly-shaped base E' of a cutter E, extending transversely through an opening F', formed in the wall of the tool-carrier F, mounted to rotate with its front end on the feed-screw C, as is plainly illustrated in the drawings, the said front end of the tool-carrier F being provided with apertures $F^2$ for the insertion of a rod for turning the said carrier to move the cutter E around within the flue B' to be cut. The stand or yoke A is cut out on one side, as plainly indicated in Fig. 1, so that the rod can be conveniently inserted in one of the apertures $F^2$ for partly turning the tool-carrier F, the rod being then inserted in another aperture $F^2$, so as to turn the tool-carrier completely around. An annular groove $F^3$ is formed on the tool-carrier F, and through this groove extends the outer end of the cutter E, so that the chips from the tube B' can pass into the said groove $F^3$.

Now it will be seen that when the several parts are in the position as illustrated in Fig. 2, and the operator turns the tool-carrier F, then the cutter E, as well as the feed-block D, is turned around, so that the cutting edge of the cutter E cuts on the inner side of the flue B'. Now by the operator turning the nut C' from time to time to move the feed-screw C outward it causes the block D to move in a like direction, and by the inclined groove D' forces the cutter E outward in the carrier F, so that the said cutter is fed into the tube B', and consequently deeper cuts are made until the tool finally cuts the flue.

In order to securely lock and hold the stand or yoke A in position, I provide the following device: On the bottom of the stand A and near the inner end thereof is formed a threaded boss A', engaged by a screw G' of a plate G, extending upwardly in front of the flue $B^2$, next to and below the flue B'. In the center of the plate G is mounted to turn a shaft H, formed at its outer end with a square offset H' for applying a wrench or other tool to turn the shaft H in the plate. On the inner end of the shaft H is formed a cam $H^2$, (see Figs. 6 and 7,) engaging jaws I, adapted to be moved firmly in contact with the inner surface of the flue $B^2$ upon turning the shaft H, so as to securely lock the shaft and plate G in place on the flue $B^2$, to firmly support the stand or yoke A in front of the flue B'. The jaws I are provided with pins or screws J, engaging elongated slots $G^2$, formed in the plate G, so as to hold said jaws I in place, and at the same time permit their outward or inward movement according to the movement of the cam $H^2$.

It will be seen that the device described is very simple and durable in construction, and can be readily applied and securely held in place, without the operator being compelled to hold onto the yoke or stand A while manipulating the carrier F and the nut C', as above explained. It is understood that for different-sized pipes or flues B' different-sized carriers F are employed.

Having thus fully described my invention, I claim as new and desire to secure by Letters Patent—

1. A boiler-tube cutter provided with a tool-carrier adapted to be turned and formed in its peripheral surface with an annular groove into which leads a transverse opening forming a guide for the cutter, substantially as shown and described.

2. A boiler-tube cutter, comprising a stand or yoke, a feed-screw mounted to turn therein, a feed-block held loosely on the said feed-screw and moving longitudinally therewith, said block being provided with an inclined groove, a cutter engaging with its inner end the said groove, a tool-carrier mounted to turn loosely on said feed-screw and formed with an opening in which slides said cutter, and means, substantially as described, for holding said yoke in position in front of the tube to be cut, said means being locked to the adjacent flue, as set forth.

3. A boiler-tube cutter, comprising a stand or yoke having a cutting device adapted to enter the tube to be cut, a plate secured to said stand or yoke and arranged to extend over an adjacent tube, jaws mounted to slide on the plate and arranged to engage the inner sides of said tube over which the plate extends, and means for moving the jaws on the plate to press them against the inner sides of the tube, substantially as set forth.

4. A boiler-tube cutter, comprising a stand or yoke having a cutting device to cut a tube, a plate connected to said stand or yoke and arranged to extend over an adjacent tube, a shaft carried by the plate having a cam and adapted to be turned, and jaws carried by the plate and actuated from said cam, said jaws being arranged to engage the inner side of the tube over which the plate extends, substantially as set forth.

5. A boiler-tube cutter, comprising a stand or yoke having a cutting device to cut the tube and provided with a screw-threaded boss, and a plate having a screw to engage the threaded boss of the stand or yoke, said plate being arranged to extend over a tube adjacent to the tube to be cut, and being provided with means to engage the inner side of said tube, substantially as set forth.

6. A boiler-tube cutter, comprising a stand or yoke having a device to cut the tube, and a plate connected to said stand or yoke and arranged to extend over an adjacent tube and provided with slots, a shaft mounted to turn in the plate and provided with a cam, screws arranged to pass through the slots in the plate, and jaws held on the screws in position to be engaged by the cam to press them into engagement with the inner walls of the tube over which the plate extends, substantially as set forth.

JULIUS RICHARD.

Witnesses:
RICHARD RUNDLE,
C. L. BECKWITH.